United States Patent
Moon

(10) Patent No.: US 8,183,831 B2
(45) Date of Patent: May 22, 2012

(54) BATTERY PACK

(75) Inventor: Deayon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 888 days.

(21) Appl. No.: 12/169,393

(22) Filed: Jul. 8, 2008

(65) Prior Publication Data

US 2009/0072785 A1    Mar. 19, 2009

(30) Foreign Application Priority Data

Sep. 17, 2007  (KR) .................. 10-2007-0094445

(51) Int. Cl.
*H01M 2/00* (2006.01)
*H01M 2/04* (2006.01)
*H01M 2/10* (2006.01)

(52) U.S. Cl. ........ 320/112; 429/100; 429/163; 429/176; 429/99

(58) Field of Classification Search .................... 429/100
See application file for complete search history.

(56) References Cited

U.S. PATENT DOCUMENTS

| | | | | |
|---|---|---|---|---|
| 4,286,028 A * | 8/1981 | Heiser et al. | ..................... | 429/82 |
| 6,068,946 A * | 5/2000 | Zedell et al. | ................... | 429/100 |
| 6,152,304 A | 11/2000 | Hikita et al. | | |
| 6,380,713 B2 * | 4/2002 | Namura | ......................... | 320/112 |
| 6,524,732 B1 | 2/2003 | Iwaizono et al. | | |
| 6,743,545 B2 * | 6/2004 | Huang | ............................ | 429/96 |
| 6,986,965 B2 | 1/2006 | Jenson et al. | | |
| 7,049,516 B1 | 5/2006 | Haag et al. | | |
| 7,088,075 B2 | 8/2006 | Baba et al. | | |
| 7,141,330 B2 * | 11/2006 | Aoyama | ......................... | 429/97 |
| 2006/0121344 A1 * | 6/2006 | Amagai et al. | ................ | 429/176 |
| 2007/0229026 A1 | 10/2007 | Morioka et al. | | |

FOREIGN PATENT DOCUMENTS

| | | |
|---|---|---|
| JP | 06-020667 | 1/1994 |
| JP | 2000-231909 | 8/2000 |
| JP | 2001-313014 A | 11/2001 |
| JP | 2002-245993 | 8/2002 |
| JP | 2002-343320 | 11/2002 |
| JP | 2006-185756 | 7/2006 |

(Continued)

OTHER PUBLICATIONS

Taiwan Office action dated Jun. 8, 2010 issued to corresponding Korean Patent Application No. 10-2007-0094445.

(Continued)

*Primary Examiner* — Edward Tso
*Assistant Examiner* — Ahmed Omar
(74) *Attorney, Agent, or Firm* — Christie, Parker & Hale, LLP

(57) ABSTRACT

A battery pack includes at least one battery cell and a base and a cover, together adapted to house the at least one battery cell. A plurality of linking holes are located on at least one first side surface of one of the base or the cover, each linking hole defined by a periphery, wherein at least a portion of the periphery includes a reinforcement that is thicker than the thickness of the first side surface. A plurality of linking protrusions are located on at least one second side surface of the other of the base or the cover, each of the plurality of linking protrusions adapted to mate with a corresponding linking hole, thereby holding the base and cover in engagement with one another.

12 Claims, 7 Drawing Sheets

FOREIGN PATENT DOCUMENTS

| | | |
|---|---|---|
| JP | 2007-213870 | 8/2007 |
| TW | 308509 | 9/1995 |
| WO | WO 98/22371 | 5/1998 |

OTHER PUBLICATIONS

English Machine Translation of JP 2000-231909 listed above, 4 pages.

English Machine Translation of JP 2002-245993 listed above, 10 pages.

English Machine Translation of JP 2001-313014A listed above, 6 pages.

English Machine Translation of JP 2006-185756 listed above, 14 pages.

* cited by examiner

BATTERY PACK

CROSS-REFERENCE TO RELATED APPLICATION

This application claims priority to and the benefit of Korean Patent Application No. 10-2007-0094445, filed on Sep. 17, 2007, the entire content of which is incorporated herein by reference.

BACKGROUND

1. Field of the Invention

The present invention relates to a battery pack, and more particularly, to a coupling mechanism between a cover and a base of a battery pack.

2. Description of the Related Art

Generally, a battery pack used for portable electronic devices such as portable computers, PDAs (Personal Digital Assistants), camcorders and others is fabricated as a bundle of several battery cells because of a capacity limit of each individual battery cell.

The battery pack may include a first case or cover having a plurality of protrusions around a periphery thereof, a second case or base having a plurality of grooves in a position corresponding to the protrusions of the first case to allow the grooves of the second case to be coupled to the protrusions of the first case, a plurality of battery cells within a space between the first and second cases, and a protective circuit board installed in one side of the battery cells to control charging and discharging. The battery pack is mounted in the portable electronic device to provide a power supply thereto. Further, the protrusions may be on the second case and the grooves may be on the first case. Additionally, the battery cells may be general cylinder type lithium ion batteries.

However, a conventional battery pack may be easily uncoupled by an external force because the first case is coupled to the second case by a simple structure of the protrusions and the grooves. For instance, after separating the battery pack from a portable electronic device, the battery pack is easily uncoupled when it is twisted by using both hands.

Furthermore, the first and second cases may be easily separated from each other by an external force such that a plurality of battery cells and a protective circuit board located inside the first case are exposed to the outside.

Additionally, when the first and second cases are separated from each other by force, the protrusions and grooves thereon may be damaged such that the first and second cases are difficult to recouple together. Accordingly, the first and second cases are not reuseable and should be discarded.

SUMMARY

According to aspects of the present invention, a coupling mechanism for a battery pack is provided to more securely attach a cover and a base of the battery pack and to prevent damage to a periphery of linking holes located on the cover to allow reuse of the battery pack.

A battery pack including at least one battery cell and a base and a cover, together adapted to house the at least one battery cell. A plurality of linking holes are located on at least one first side surface of one of the base or the cover, each linking hole defined by a periphery, wherein at least a portion of the periphery includes a reinforcement that is thicker than the thickness of the first side surface. A plurality of linking protrusions are located on at least one second side surface of the other of the base or the cover, each of the plurality of linking protrusions adapted to mate with a corresponding linking hole, thereby holding the base and cover in engagement with one another.

The reinforcement may extend along a leading edge of each linking hole of the plurality of linking holes in a direction in which the plurality of linking holes are insertable into the linking protrusions and wherein the reinforcement extends between adjacent linking holes of the plurality of linking holes. Additionally, the reinforcement may extend along a trailing edge of each linking hole of the plurality of linking holes, the trailing edge located opposite from the leading edge.

In one exemplary embodiment, a thickness of the rib and the reinforcement combined is about equal to or larger than a thickness of the rib and the distance between the second side wall and the rib is substantially equal to a thickness of the extended surface. Further, a step formed by a thickness difference between the first side wall and the extended surface may contact a lower edge of the second side wall when the base is coupled to the cover.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
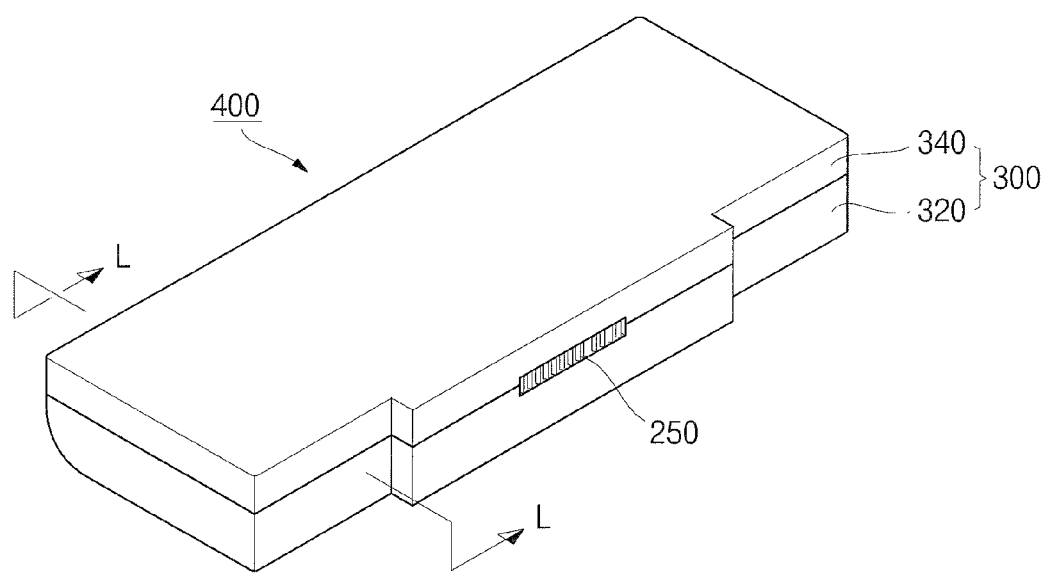
FIG. 1 is a perspective view illustrating a battery pack according to an exemplary embodiment of the present invention.

In the following detailed description, only certain exemplary embodiments of the present invention are shown and described, by way of illustration. As those skilled in the art will recognize, the invention may be embodied in many different forms and should not be construed as being limited to the embodiments set forth herein. Like reference numerals designate like elements throughout the specification.

Generally, a secondary battery is capable of being charged and discharged, as opposed to a primary battery which typically is not rechargeable. With reference to FIG. 1, a secondary battery may be fabricated in a battery pack 400, mounted in electronic devices such as a portable computer, and widely used as a power supply. The battery pack 400 shown in the drawing is only an example, and it will be understood that the battery pack may also have various other shapes.

Figure 2:
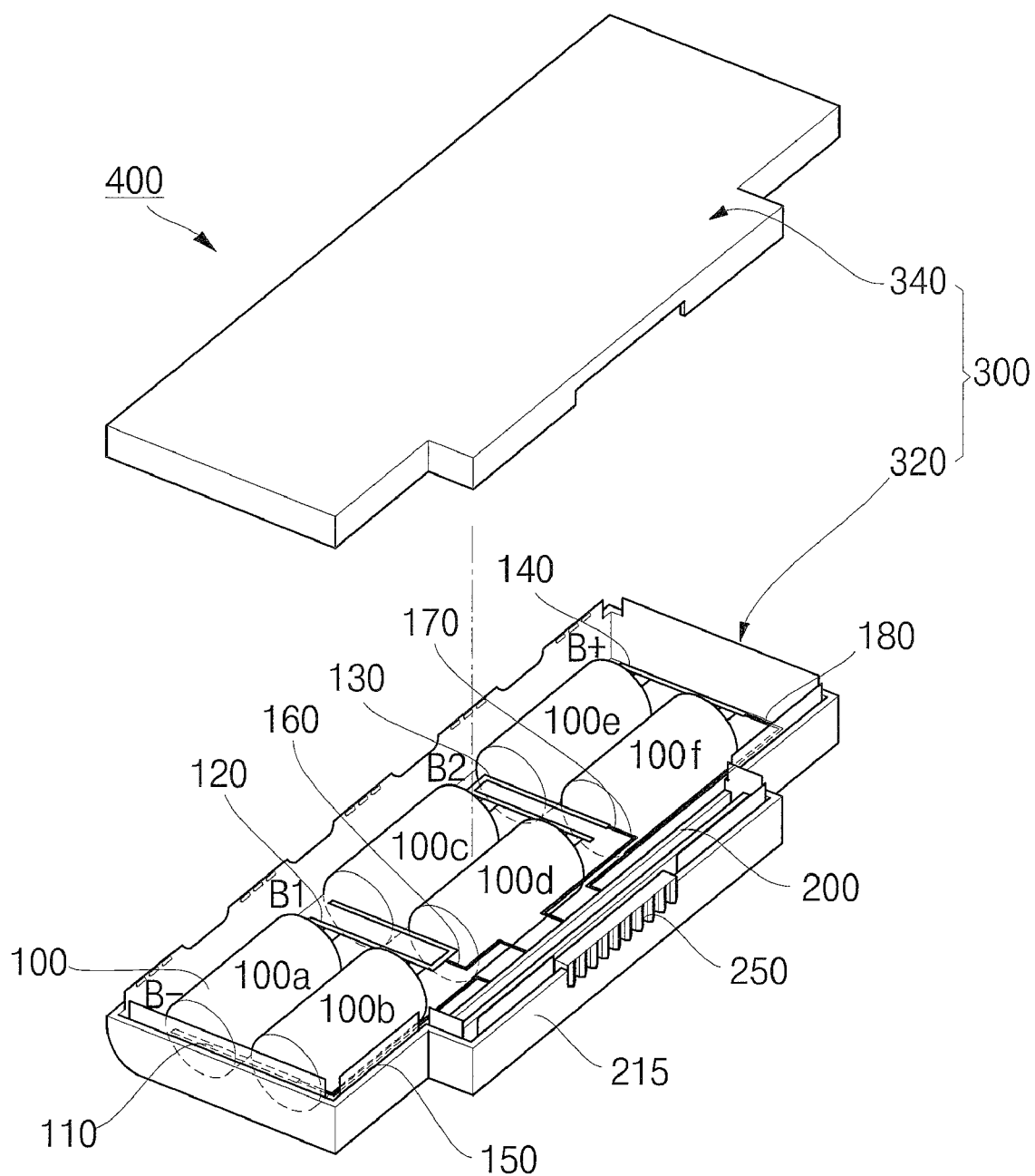
FIG. 2 is an exploded perspective view illustrating the battery pack shown in FIG. 1.

Referring to FIGS. 1 and 2, the battery pack 400 includes a plurality of battery cells 100, a protective circuit module (PCM) 200 electrically coupled to the battery cell 100, and a case 300 housing the battery cell 100 and the protective circuit module 200.

Each of the battery cells 100 is designed so that top and bottom surfaces thereof have different polarity, wherein the top surface has a bulged terminal acting as a positive electrode, and the flat bottom surface acting as a negative electrode. Further, the top and bottom surfaces of the battery cell 100 may be electrically coupled to the positive electrode and negative electrode, respectively, of an electrode assembly inside the battery cell 100. Herein, a cylinder type secondary battery capable of being charged and discharged can be used as the battery cell 100. In one exemplary embodiment, a cylinder type lithium secondary battery having a high working voltage of 3.6V and high energy density per weight may be used. Six battery cells 100 are illustrated in the drawing, but the number and type of battery is not limited thereto. In FIG. 2, a plurality of battery cells 100 are referenced individually as 100a, 100b, 100c, 100d, 100e and 100f.

B− and B+ in the drawing indicate large electric current terminals, and show a power supply part of both ends of the battery cells 100 connected in series or parallel. B− shows a minimum potential terminal as a power supply of a negative electrode, and B+ shows a maximum potential terminal as a power supply of a positive electrode. Conductive tabs 150, 180 for extracting power may be connected to the large electric current terminals. In one exemplary embodiment, the conductive tabs 150, 180 may have a generally inverted T-shape before they are bent. The "-" or horizontal portion of the inverted T-shape may be where the positive electrode and the negative electrode are welded and fixed, and the "|" or vertical portion is where the conductive tab is soldered and fixed.

B1 and B2 indicate sensing terminals, and show a portion of battery cells having different polarity connected in series. The sensing terminal indicates an intermediate potential terminal between the maximum potential terminal and the minimum potential terminal. Conductive tabs 160, 170 for detecting a voltage may be connected to the sensing terminal. Similarly to the conductive tabs 150, 180, conductive tabs 160, 170 may have a generally inverted T-shape before they are bent. The "-" or horizontal portion of the inverted T-shape may be where the positive electrode and the negative electrode are welded and fixed, and the "|" or vertical portion is where the conductive tab is soldered and fixed.

More particularly, a first conductive plate 110 is connected to negative electrodes of two cells located at an end of a lower side of the battery cell, i.e., the minimum potential end. Second and third conductive plates 120, 130, respectively have bent portions, one side of the bent portion contacting and being fixed on an upper surface of two cells, and the other side of the bent portion contacting and being fixed on a bottom surface of the other two bare cells so as to be connected to four cells in series and parallel. A fourth conductive plate 140 is connected to positive electrodes of two cells located at an end of an upper side of the battery cell, i.e., the maximum potential end. The conductive plate may be made of any one selected from nickel, copper, aluminum, and their equivalents, but is not limited thereto. The number of the conductive plate may increase as the number of the bare cell increases.

The protection circuit module 200 is electrically coupled to the bare cell 100 through the first to the fourth conductive tabs 150, 160, 170 and 180 connected to the first to the fourth conductive plates 110, 120, 130 and 140. The protection circuit module 200 is connected to an electronic device via a connector 250 to prevent over-discharge and over-charge of the battery by controlling discharge and charge of the battery through a circuit formed within the battery. The first to the fourth conductive tabs 150, 160, 170 and 180 may be made of nickel and replaced by coated conductive wire. Various methods for electrically coupling the protection circuit module 200 to the battery cell 100 may be used, depending on shape and a type of the battery cell and the protection circuit module, but not limited thereto.

The protection circuit module 200 includes the connector 250 formed in an approximate rectangular box shape on one surface thereof. The connector 250 includes a body having a plurality of holes to be electrically coupled to and separable from the outer electronic device, and a plurality of conductive leads extending to an interior and rear of the holes of the body. The body may be composed of insulating resin, etc., so that the conductive leads do not electrically short each other.

The case 300 housing the battery cell 100 and the protection circuit module 200 includes a first case or base 320 in which the battery cells 100 and the protection circuit module 200 are seated, and a second case or cover 340 covering the base 320.

The base 320 may be a box with an open top for receiving the bare cells 100. The base 320 has an extension 215 on one side of the base 320 to receive the protection circuit module 200 and the connector 250. The extension 215 includes an exposing groove to expose the connector 250. The cover 340 is sized to correspond to the opened surface of the base 320.

Figure 3:
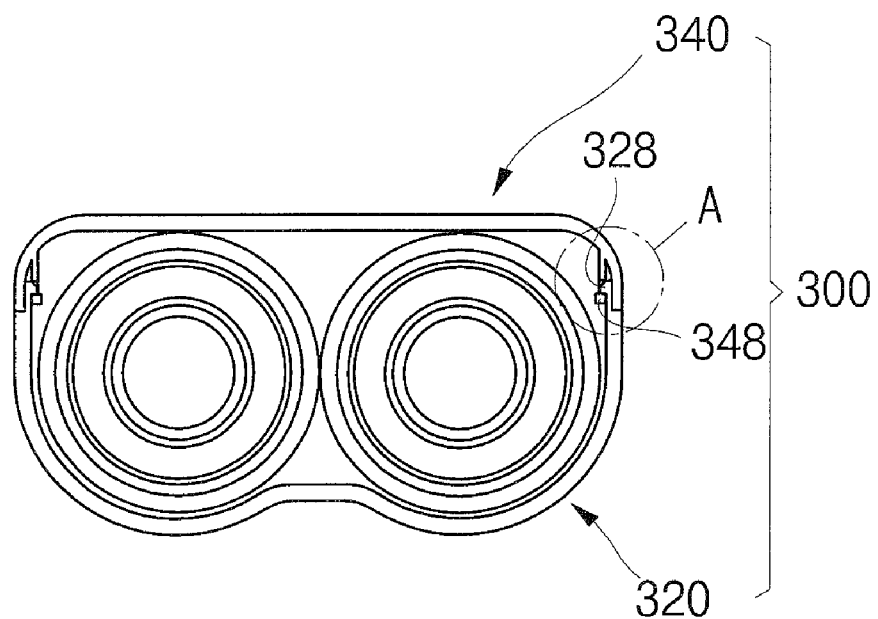
FIG. 3 is a cross-sectional view illustrating the battery pack taken along the line L-L in FIG. 1.
Figure 4:
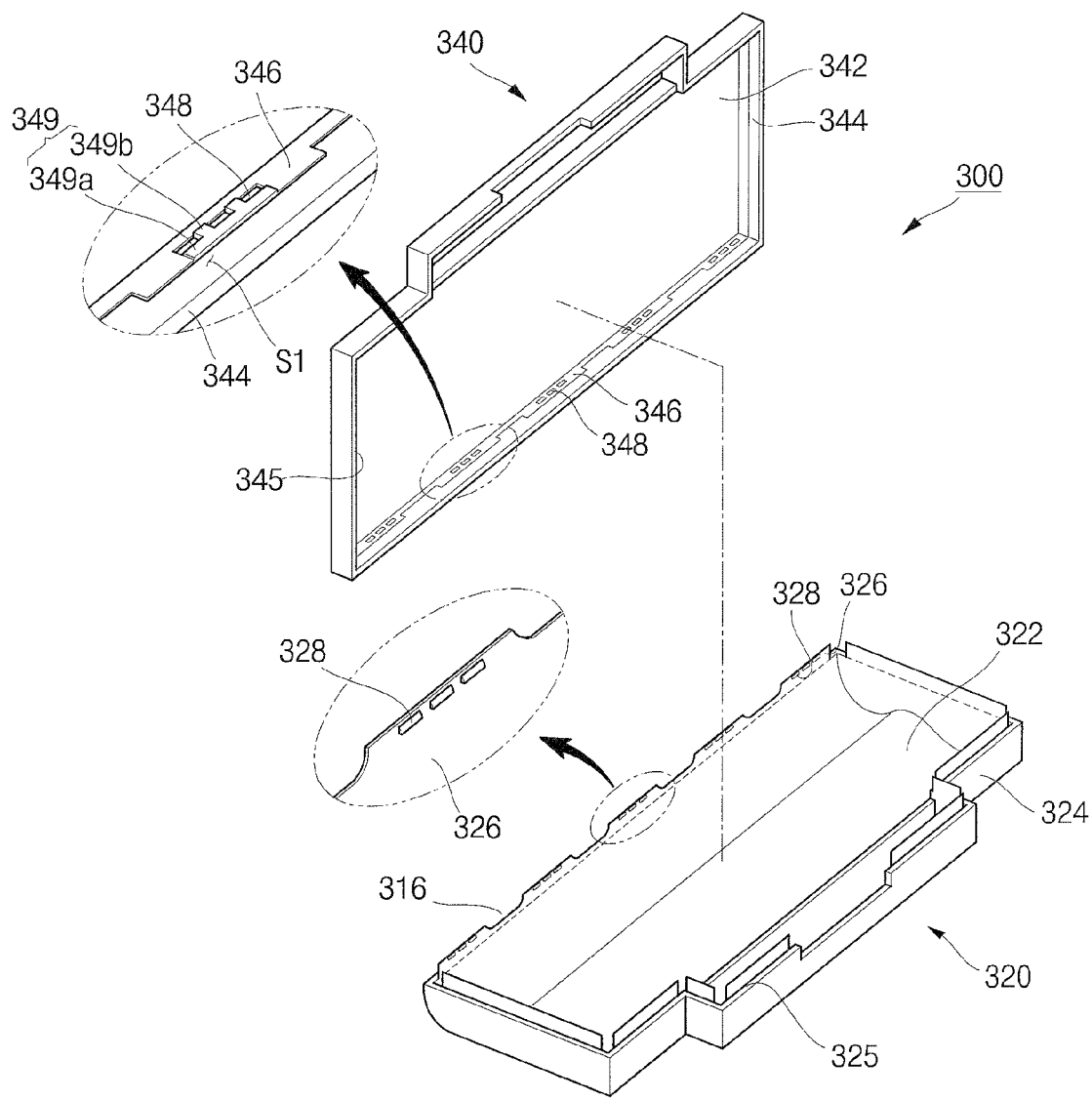
FIG. 4 is an exploded view illustrating the battery pack shown in FIG. 1.
Figure 5:
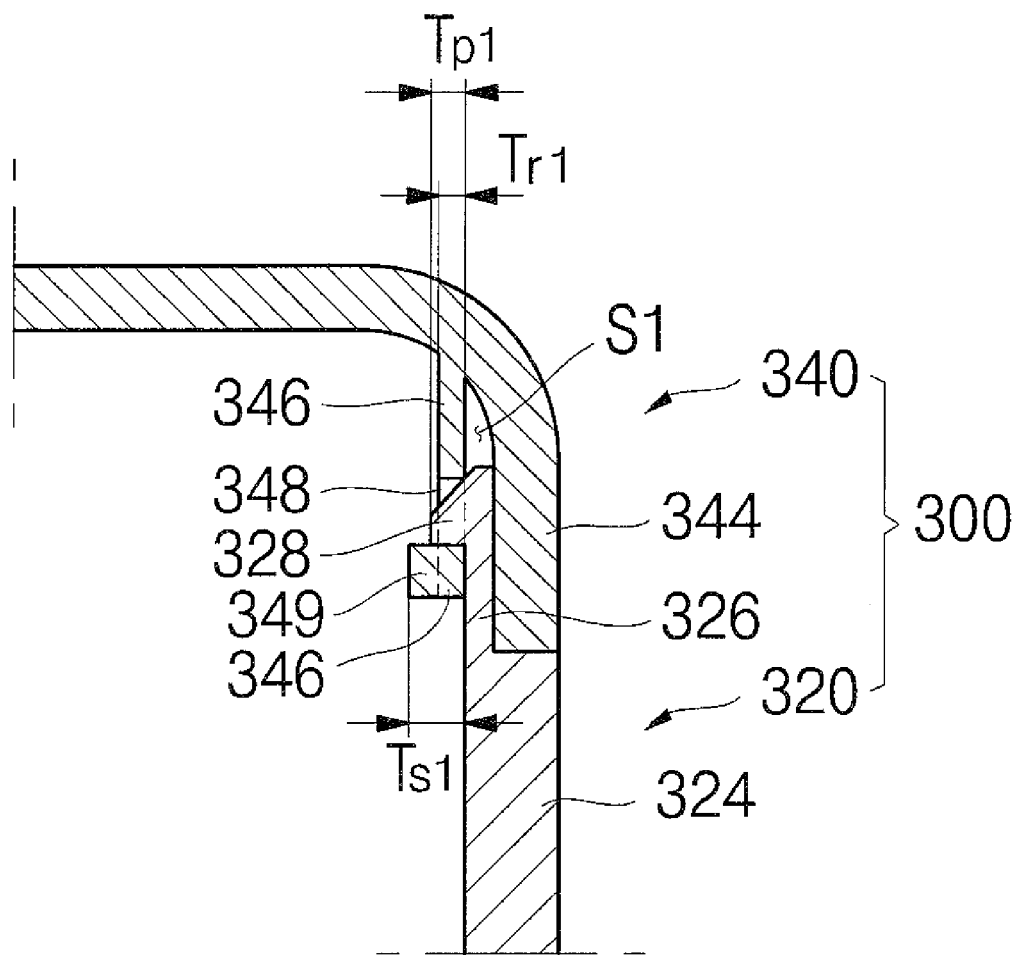
FIG. 5 is a magnified cross-sectional view illustrating part 'A' of FIG. 3.

Referring to FIG. 3, the base 320 is adapted to mate with the cover 340 by coupling a linking protrusion 328 on one surface of the base 320 to a linking hole 348 on one surface of the cover 340 to form a closed case 300 of the battery pack 400. With reference also to FIGS. 4 and 5, a periphery of the linking hole 348 is thicker than the rest of the surface of the cover 340 to increase a coupling force against external forces between the linking protrusion 328 and the linking hole 348. Additionally, the increased thickness prevents damage to the periphery of the linking hole 348 when the base 320 and the cover 340 are separated by force. The increased thickness of the linking holes 348 may extend along a leading edge of the linking holes 348 in a direction in which the linking protrusions 328 are linked with the linking holes 348, and in a region between the adjacent linking holes 348. A detailed explanation about the linking protrusions 328 and the linking holes 348 will be provided below.

In one exemplary embodiment, the case 300 includes an extension 215 on one side. However, as will be appreciated, the case may have one of a variety of shapes, depending on the structure of the battery pack.

As noted above, the battery pack 400 is formed by covering the battery cell 100 and the protection circuit module 200 with the case 300. The battery pack 400 is mounted in external electronic devices such as a portable computer. The base 320 is coupled to the cover 340 by coupling the linking holes 348 to the linking protrusions 328 with a locking structure, thereby holding the base and cover in engagement with each other to form the case 300. The case 300 will be explained in detail hereinafter.

Referring to FIG. 4, the base 320 includes a seating surface 322, a first side wall 324 extending from an edge of the seating surface 322, an extended surface 326 extending from the first side wall 324, and a plurality of linking protrusions 328 on the interior of the extended surface 326. The seating surface 322 of the base 320 is a surface where a plurality of battery cells 100 and the protection circuit module 200 are seated. The seating surface 322 may have curved surface shape when the battery cell is a cylinder type.

The first side wall 324 of the base 320 extends from the edge of the seating surface 322 so as to partially cover the plurality of the battery cells 100. The extended surface 326 of the base 320 extends from an edge of the interior of the first side wall 324 parallel to the first side wall 324, and contacts a rib 346 of the cover 340 to couple the base 320 to the cover 340.

More particularly, the extended surface 326 is shaped to abut the edge of the interior of the first side wall 324. The extended surface 326 is thinner than the first side wall 324, and a step 325 is formed between the first side wall 324 and the extended surface 326 by the thickness difference of the first side wall 324 and the extended surface 326. Accordingly, when the base 320 is coupled to the cover 340, the step 325 of the base 320 contacts a lower edge 345 of the cover 340, and the extended surface 326 of the base 320 contacts the rib 346 of the cover 340 inside the case 300 where the base 320 is coupled to the cover 340. Herein, grooves 316 may be spaced along the extended surface 326.

The linking protrusion 328 of the base 320 protrudes from an interior of the extended surface 326. The base 320 is coupled to the cover 340 by coupling the linking protrusion 328 to the linking hole 348 of the cover 340. The linking protrusion 328 may taper down from a first edge to a second edge such that, for example, a cross-sectional shape of the linking protrusion is generally triangular. Accordingly, the linking protrusion 328 is easily inserted into the linking hole 348 of the cover 340, and is relatively difficult to remove once inserted. A plurality of linking protrusions 328 may be spaced along the extended surface 326 in groups of two or three linking protrusions. As will be appreciated, the number and the shape of the linking protrusions 328 may be different, depending on a size and design of the base 320.

The base 320 may be composed of insulating resin, and may be formed integrally by injection molding the seating surface 322, the first side wall 324, the extended surface 326 and the plurality of the linking protrusions 328.

The cover 340 includes a cover surface 342, a second side wall 344 extending from an edge of the cover surface 342, a rib 346 formed inside the second side wall 344, a plurality of linking holes 348 formed on the rib 346, and a reinforcement 349 protruding from an interior of the rib 346 around a periphery of the linking holes 348.

The cover surface 342 of the cover 340 is a surface generally corresponding to the seating surface 322 of the base 320 when the cover is coupled to the base 320, and may be formed in a generally rectangular shape. The cover surface 342 of the cover 340 may include a hole for emitting heat generated from the battery cell 100.

The second side wall 344 of the cover 340 is a surface extending from the edge of the cover surface 342 so as to partially cover the plurality of the battery cells 100. An edge 345 of the cover 340 contacts the step 325 of the base 320.

The rib 346 of the cover 340 is a surface extending parallel to the second side wall 344 from an interior of the cover surface 342 and spaced from the second side wall 344. Since the rib 346 is spaced from the second side wall 344, a space S1 (FIG. 5) is formed between the rib 346 and the second side wall 344 of the cover 340. The extended surface 326 of the base 320 is inserted into the space S1 when the base 320 is coupled to the cover 340. Accordingly, a distance between the rib 346 and the second side wall 344 of the cover 340 is about the same as a thickness of the extended surface 326 of the base 320.

The plurality of the linking holes 348 of the cover 340 are formed on the rib 346 and defined by a periphery. The base 320 is coupled to the cover 340 by coupling the plurality of the linking holes 348 to the linking protrusions 328 of the base 320. The number of linking holes 348 corresponds to the number of the linking protrusions 328 of the base 320 and the linking holes 348 are located to correspond to a location of the linking protrusions 328 of the base 320 in the rib 346 to mate with the linking protrusions 328.

Referring to FIG. 4, the reinforcement 349 of the cover 340 is formed around a partial periphery of the linking holes 348 in an interior of the rib 346. More particularly, the reinforcement 349 includes a first reinforcement 349a formed along a leading edge of the linking holes 348 in a direction in which the linking protrusions 328 are coupled to the linking holes 348, and a second reinforcement 349b formed between adjacent linking holes 348.

Referring to FIG. 5, the reinforcement 349 is formed on an interior of the rib 346 along a partial periphery of the linking holes 348. A total thickness Ts1 of the rib 346 and the reinforcement 349 is thicker than a rib thickness Tr1 without the reinforcement 349. Accordingly, by reinforcing the strength of the periphery of the linking hole 348, a coupling force of the linkage formed by the linking holes 348 and the linking protrusions 328 is not only increased, but damage to a weak portion of the linking holes 348, i.e., the periphery of the linking holes, against external forces may also be prevented or reduced.

For example, when the battery cell housed inside the case 300 needs to be replaced, the base 320 and the cover 340 must be separated by force. In this case, the reinforcement 349 may prevent the linking holes 348 and the periphery of the linking holes 348 from being damaged when the case is opened by reinforcing the strength of the periphery of the linking hole 348. Herein, the total thickness Ts1 of the rib 346 and the reinforcement 349 may be about 1.0-1.5 times thicker than a protruded thickness Tr1 of the linking protrusions 328. When the total thickness Ts1 of the rib 346 and the reinforcement 349 is smaller than the protruded thickness Tr1 of the linking protrusions 328, the base 320 may be too easily separated from the cover 340 by external force because the coupling force between the linking protrusions 328 and the linking hole 348 is weak. When the total thickness Ts1 of the rib 346 and the reinforcement 349 is 1.0-1.5 times thicker than the protruded thickness Tr1 of the linking protrusions 328, the base 320 is more difficult to separate from the cover 340.

The cover 340 may be formed of insulating resin, and may be formed integrally by injection molding a cover surface 342, the second side wall 344, the rib 346, a plurality of linking holes 348 and a reinforcement 349.

Coupling of the base 320 and the cover 340 is formed by linking the locking structure including the linking protrusions 328 and the linking hole 348. The coupling of the base 320 and the cover 340 will be explained in detail with reference to FIG. 5.

Referring to FIG. 5, the extended surface 326 of the base 320 is inserted into the space S1 between the rib 346 and the second side wall 344 of the cover 340, and by inserting the linking protrusions 328 into the linking holes 348 formed on the rib 346.

As described above, the battery pack 400 may have increased strength around a periphery of the linking holes 348 due to the reinforcement 349 extending around a partial periphery of the linking holes 348. Accordingly, the coupling force of the linkage between the linking protrusions 328 of the base and the linking holes 348 of the cover 340 may be increased without any degradation of quality. Accordingly, although an external force may be applied to the battery pack 400, the base 320 is not separated easily from the cover 340. Additionally, damage to a periphery of the linking holes 348 may be prevented when force is generated when the base 320 and the cover 340 are separated, allowing the base 320 and the cover 340 to be recoupled, thereby permitting the battery pack to be reused.

A case 500 of a battery pack according to another exemplary embodiment of the present invention will be explained hereinafter with reference to FIGS. 6 and 7. The case 500 of the battery pack is similar in structure and function as the case 300 of the battery pack as previously described. However, a reinforcement 549 of a cover 540 is different. Accordingly, duplicated explanation of the same components will be omitted, and only the differences of the reinforcement 549 and coupling of the base 520 and the cover 540 including the reinforcement 549 will be detailed.

Figure 6:
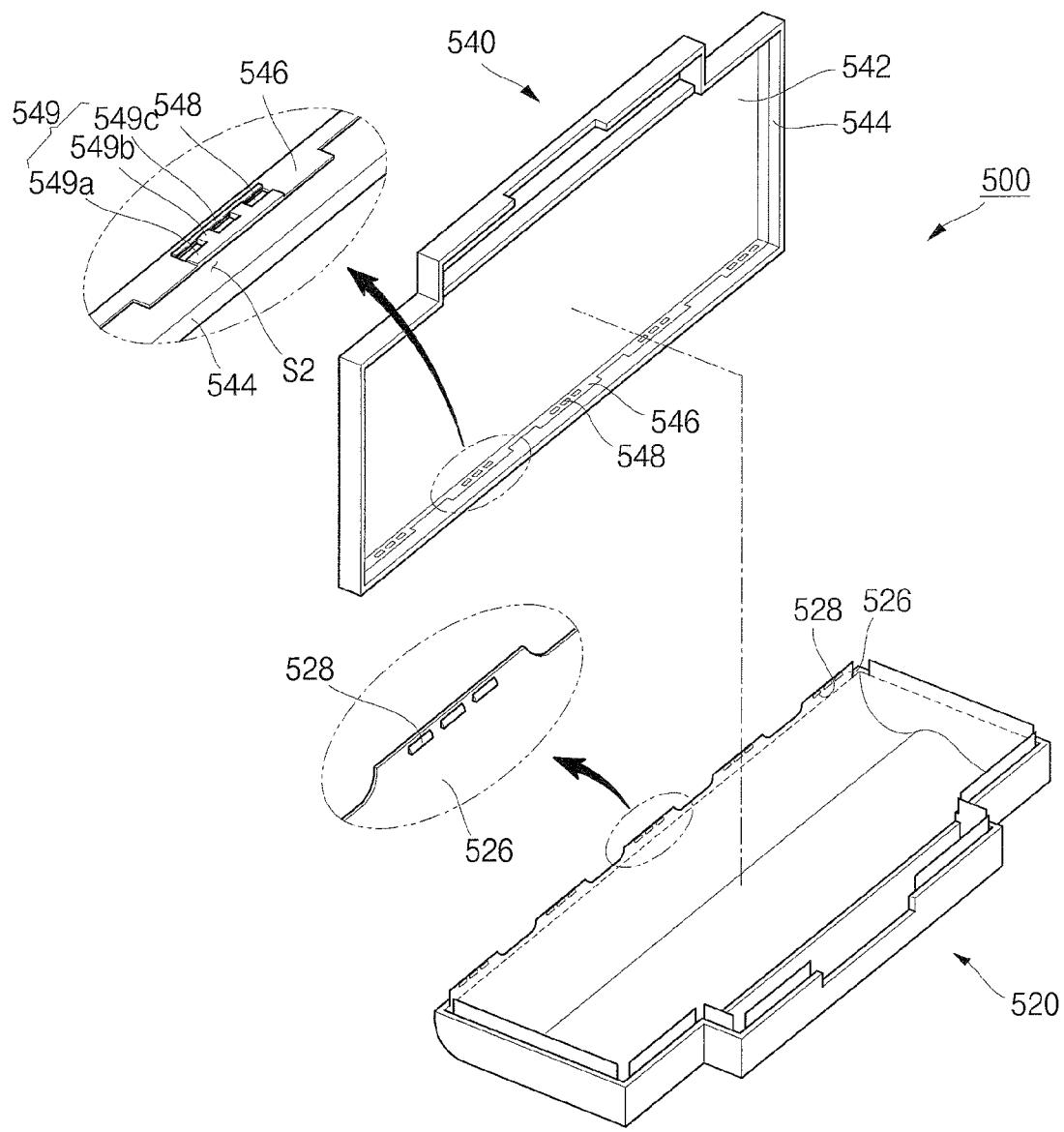
FIG. 6 is an exploded view illustrating a battery pack according to another exemplary embodiment of the present invention.
Figure 7:
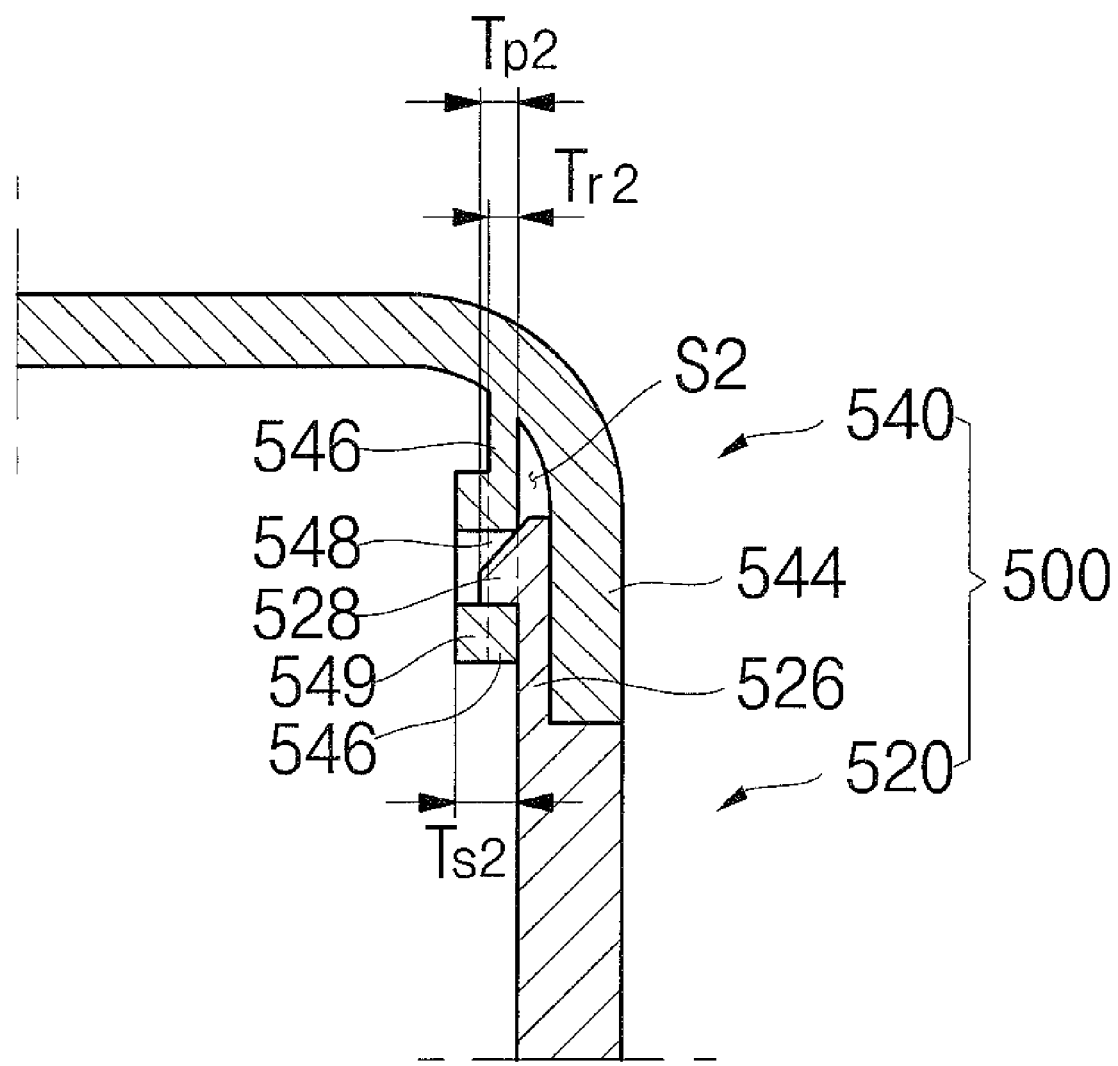
FIG. 7 is a partial cross-sectional view illustrating a coupling part of a cover and a base shown in FIG. 6.

Referring to FIGS. 6 and 7, the case 500 of the battery pack includes the base 520 and the cover 540. The reinforcement 549 of the cover 540 is formed on a partial periphery of linking holes 548 in an interior of the rib 546. More particularly, the reinforcement 549 includes a first reinforcement 549a formed on a leading edge of the linking holes 548 in a direction in which the linking protrusions 528 of the base 520 are coupled to the linking holes 548 of the cover 540, a second reinforcement 549b formed on a region between adjacent linking holes 548, and a third reinforcement 549c formed on a trailing edge of the linking holes 548, the trailing edge located opposite the leading edge of the linking holes 548. The reinforcement 549 does not extend all the way to the cover surface 542 because if the reinforcement 549 is formed on the entire rib 546, then marginal space is lessened on the cover 540. Additionally, force generated when the base 520 and the cover 540 are separated by external force does not often extend all the way to the cover surface 542.

Comparing the reinforcement 549 with the reinforcement 349 shown in FIG. 4, the reinforcement 549 further includes the third reinforcement 549c formed in the interior of the rib 546 of the cover 540, thereby allowing the strength of the periphery of the linking holes 548 to be increased. Accordingly, a coupling force of the base 520 and the cover 540 against external force is not only increased, but damage of a weak portion of the linking holes 548, i.e., the periphery of the linking holes against the external force may also be effectively prevented or reduced when the base 520 and the cover 540 are separated.

The cover 540 having the reinforcement 549 may be formed of the same insulating resin as the cover 340 shown in FIG. 4, and formed integrally by injection molding a cover surface 542, the second side surface 544, a rib 546, a plurality of linking holes 548 and the reinforcement 549.

Referring to FIG. 7, coupling of the base 520 and the cover 540 is formed by linking of the locking structure of the linking protrusions 528 and the linking holes 548. More particularly, the extended surface 526 of the base 520 is inserted into the space S2 formed between the rib 546 and the second side surface 544 of the cover 540, and the linking protrusions 528 formed in the interior of the extended surface 526 are inserted into the linking holes 548 formed on the rib 546, so that the base 520 is coupled to the cover 540.

The relationship of the total thickness Ts2 of the rib 546 and the reinforcement 549 with the thickness Tr2 of the rib 546 without the reinforcement 549 is the same as the relationship of the total thickness Ts1 of the rib 346 and the reinforcement 349 with the thickness Tr1 of the rib 346 without the reinforcement 349 shown in FIG. 5, and thus explanation about such relationship will be omitted.

Similarly, relationship of the total thickness Ts2 of the rib 546 around a periphery of the linking holes 548 and the reinforcement 549 with the thickness Tp2 of the linking protrusions 528 is the same as relationship of the total thickness Ts1 of the rib 346 around a periphery of the linking holes 348 and the reinforcement 349 with the thickness Tp1 of the linking protrusions 328 shown in FIG. 5, and thus explanation about the relationship will be omitted.

As described above, the battery pack according to the present exemplary embodiment may have greater strength around the periphery of the linking holes 548 due to the reinforcement 549 including the first reinforcement 549a, the second reinforcement 549b, and the third reinforcement 549c in the interior of the rib 546 around the periphery of the linking holes 548 of the cover 540 than a battery pack having reinforcement 349 including the first reinforcement 349a and the second reinforcement 349b in the interior of the rib 346 of the periphery of the linking holes 348 of the cover 340. Accordingly, the coupling force of the linkage, where the linking protrusions 528 of the base 520 are coupled to the linking holes 548 of the cover 540, may be further increased without any degradation of quality. Accordingly, although external force may be applied to the case 500, the base 520 and the cover 540 are not easily separated. Furthermore, damage to the periphery of the linking holes 548 generated when the base 520 and the cover 540 are separated by force is prevented or reduced, thereby allowing the battery pack to be reused.

The battery pack according to the present invention provides one or more of the following benefits.

First, the strength of the periphery of the linking hole is increased due to the reinforcement on the interior of the rib of the cover, thereby allowing the coupling force between the linking protrusion of the base and the linking hole of the cover to be increased without the degradation of the outer quality.

Second, the base and cover can be recoupled and reused because damage to a weak portion of the linking hole can be prevented or reduced when the base and cover are separated by force.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
    at least one battery cell;
    a base and a cover, together adapted to house the at least one battery cell;
    a plurality of linking holes extending through at least one first side surface of one of the base or the cover, each of the linking holes defined by a periphery, wherein at least a portion of the periphery includes a reinforcement that when combined with the at least one first side surface is thicker than a thickness of the first side surface, wherein the portion of the periphery including the reinforcement is on a leading edge of each of the plurality of linking holes at a distal end of a corresponding one of the at least one first side surface and extends between adjacent linking holes and on a trailing edge of each of the plurality of linking holes, the trailing edge being opposite the leading edge, and wherein the reinforcement is spaced from an edge of the at least one side surface; and
    a plurality of linking protrusions on at least one second side surface of the other of the base or the cover, each of the plurality of linking protrusions adapted to mate with a corresponding linking hole, thereby holding the base and the cover in engagement with one another.

2. The battery pack of claim 1, wherein the at least one battery cell comprises a plurality of cylinder type lithium ion batteries.

3. The battery pack of claim 1, further comprising a protective circuit module within the base.

4. A battery pack, comprising:
- at least one battery cell;
- a base for housing the battery cell, the base including a seating surface adapted to seat the at least one battery cell, a first side wall extending from an edge of the seating surface, an extended surface extending from an interior edge of the first side wall parallel to the first side wall, and a plurality of linking protrusions on an interior of the extended surface; and
- a cover including a cover surface, a second side wall extending from an edge of the cover surface, a rib extending from an interior of the cover surface, the rib spaced from and parallel to the second side wall, and a plurality of linking holes defined by a periphery and extending through the second side wall, each of the linking holes adapted to mate with a corresponding one of the plurality of linking protrusions, thereby holding the base and the cover in engagement with one another, wherein at least a portion of the periphery includes a reinforcement comprising a first reinforcement toward a leading edge of each of the plurality of linking holes at a distal end of the first side wall, a second reinforcement extending between adjacent linking holes, and a third reinforcement extending along a trailing edge of each of the plurality of linking holes, the trailing edge being opposite the leading edge.

5. The battery pack of claim 4, wherein a thickness of the rib and the reinforcement combined is about equal to or larger than a thickness of the rib.

6. The battery pack of claim 4, wherein a thickness of the rib and the reinforcement combined is about 1.0-1.5 times greater than a thickness of each linking protrusion of the plurality of linking protrusions.

7. The battery pack of claim 4, wherein each linking protrusion of the plurality of linking protrusions protrudes from an interior of the extended surface in a tapered shape.

8. The battery pack of claim 4, wherein the distance between the second side wall and the rib is substantially equal to a thickness of the extended surface.

9. The battery pack of claim 4, wherein the extended surface is thinner than the first side wall.

10. The battery pack of claim 9, wherein a step formed by a thickness difference between the first side wall and the extended surface contacts a lower edge of the second side wall when the base is coupled to the cover.

11. The battery pack of claim 4, wherein the at least one battery cell comprises a plurality of cylinder type lithium ion batteries.

12. The battery pack of claim 4, further comprising a protective circuit module within the base.

* * * * *

UNITED STATES PATENT AND TRADEMARK OFFICE
CERTIFICATE OF CORRECTION

| | |
|---|---|
| PATENT NO. | : 8,183,831 B2 |
| APPLICATION NO. | : 12/169393 |
| DATED | : May 22, 2012 |
| INVENTOR(S) | : Dae Yon Moon |

It is certified that error appears in the above-identified patent and that said Letters Patent is hereby corrected as shown below:

On the Title Page

(75) Inventor: Deayon Moon          Delete "Deayon Moon"
                                        Insert -- Dae Yon Moon --

Signed and Sealed this
Nineteenth Day of November, 2013

Teresa Stanek Rea
*Deputy Director of the United States Patent and Trademark Office*